United States Patent [19]

Hirsch

[11] 4,178,871
[45] Dec. 18, 1979

[54] AUTOMATIC CONTROL SYSTEM FOR HYDROFOIL CRAFT

[75] Inventor: Irving A. Hirsch, Bellevue, Wash.

[73] Assignee: The Boeing Company, Seattle, Wash.

[21] Appl. No.: 435,672

[22] Filed: Jan. 23, 1974

[51] Int. Cl.$^2$ .............................................. B63B 1/18
[52] U.S. Cl. ..................................... 114/275; 114/282
[58] Field of Search .................. 114/66.5 H, 275, 282; 244/77 M

[56] References Cited

U.S. PATENT DOCUMENTS

| | | | |
|---|---|---|---|
| 2,673,314 | 3/1954 | MacCallum | 244/77 M |
| 2,859,005 | 11/1958 | Owen et al. | 244/77 M |
| 3,100,861 | 8/1963 | Osder | 244/77 M |
| 3,137,260 | 6/1964 | Harris, Jr. et al. | 114/66.5 H |
| 3,156,209 | 11/1964 | Ask | 114/66.5 H |
| 3,403,874 | 10/1968 | Boskovich et al. | 244/77 M |
| 3,422,327 | 1/1969 | McBrayer et al. | 244/77 M |
| 3,504,649 | 4/1970 | Scherer | 114/66.5 H |
| 3,800,727 | 4/1974 | Stark et al. | 114/66.5 H |

Primary Examiner—Stephen C. Bentley
Assistant Examiner—Thomas H. Webb
Attorney, Agent, or Firm—Thomas H. Murray

[57] ABSTRACT

A control system for hydrofoil craft is one in which control surfaces are moved automatically in response to signals derived from the motion of the craft to stabilize and control the craft. In such systems, a potentially dangerous condition can occur in case of a failure or malfunction in the roll control system. In order to prevent such conditions, two redundant roll sensing devices are provided which normally generate identical signals to actuate the control surfaces to stabilize the rolling motion. In case of a failure or malfunction, the signals provided by the two sensing devices become different. When this occurs, all normal control signals to the control surfaces are terminated; and secondary feedback loops act to position all control surfaces to smoothly land the craft.

6 Claims, 4 Drawing Figures

AUTOMATIC CONTROL SYSTEM FOR HYDROFOIL CRAFT

ORIGIN OF THE INVENTION

The invention herein described was made under a contract with the U.S. Department of the Navy.

BACKGROUND OF THE INVENTION

In a hydrofoil seacraft, the hull of the craft is lifted out of the water by means of foils which are carried on struts and usually pass through the water beneath the surface thereof. In passing through the water, and assuming that sufficient speed is attained, the foils create enough lift to raise the hull above the surface and hence eliminate the normal resistance encountered by a ship hull in passing through the water.

In the usual case, there are forward and aft foils both provided with control flaps similar to those used on aircraft, although in some cases the entire foils may be rotatable and used as control surfaces. The other essential control element is the rudder which pierces or is submerged beneath the surface of the water and may be either forward or aft of the craft depending upon its design. In most hydrofoils, the flaps or control surfaces are used primarily to cause the craft to ascend or descend and to control the craft about its pitch and roll axes. However, they can also be used in combination with the rudder to bank the ship about its roll axis during a turn. The flaps are also used to stabilize the craft during movement on water, so that pitching or rolling motions can be minimized by proper counterbalancing movement of the flaps. A control system of this type is disclosed and claimed in a copending application of D. R. Stark et al, Ser. No. 302,559, filed Oct. 31, 1972 and assigned to the assignee of the present invention. The invention described herein is particularly useful in a system of this type although its usefulness is not necessarily restricted to this particular system.

In any hydrofoil control system, safety is a paramount consideration. In the type of control mentioned above, the roll control system comprises sensing means for sensing motion of the craft about the roll axis and means responsive to the signals generated by this sensing means to effect the desired movement of the control surfaces to counteract the rolling motion and stabilize the craft about the roll axis. In case of a failure or malfunction in this roll control system, an unsafe condition can develop in which the motion of the craft becomes unstable, and the craft can exhibit divergent motions such that it may impact the water with angular rates of motion and attitudes that can endanger personnel on board the craft and cause possible damage to the ship. It is desirable, therefore, to detect the occurrence of such a failure promptly and to cause the ship to land, that is, to descend from the foil-borne mode to the hull-borne mode of operation, before these potentially dangerous conditions can result.

In copending application Ser. No. 342,024, filed Mar. 16, 1973, an automatic ship landing system is described wherein the signals provided by two roll gyros are compared; and when they are not the same, a signal is produced to initiate landing action by rotating the forward flap or control surface only to cause the craft to land rapidly. The remaining control surfaces, however, are not affected during the landing procedure.

While the system shown in the aforesaid copending application Ser. No. 342,024 is satisfactory, particularly for military craft, it does have certain disadvantages. First, no attempt is made in that system to negate the source of the unsafe condition and in certain cases uncontrolled roll motions are aggravated. In this respect, the craft can still experience roll angles in excess of 20° and roll rates in excess of 15° per second for the reason that the aft flaps which compensate for roll, are still under the control of the signals derived from the roll gyros. Secondly, a hydrofoil craft operating at very shallow depth will have the hull considerably further out of the water and the craft can be potentially unsafe in the presence of a roll failure. Thirdly, in the system described in the aforesaid copending application, the craft is landed as fast as possible. Consequently, the hull will contact the water extremely hard. This is annoying to passengers and can possibly cause injury.

SUMMARY OF THE INVENTION

In accordance with the present invention, the foregoing disadvantages of prior art automatic landing systems for hydrofoil craft are obviated by a system wherein all control signals to the servo systems for the control surfaces are disconnected when the outputs from two roll gyros differ by a predetermined amount. At the same time, the craft is smoothly landed by secondary servo feedback loops for each of the control surfaces. The invention further incorporates means for preventing a landing procedure in response to large, momentary transients which occur in either roll system.

Specifically, there is provided in accordance with the invention two sensing devices which sense the motion of the craft about its roll axis and which generate signals to actuate the control surfaces as required. Under normal conditions, these signals from the two sensing devices are substantially identical and operation of the craft is via the normal control system. If a failure or malfunction occurs in either roll gyro system, however, the output signals from the gyros become different; and this difference is utilized to detect the failure. For this purpose, means are provided for comparing the signals from the two gyros; and if the signals differ by more than a predetermined amount, a signal is produced to disconnect all normal control signals from the control surface servos. At this time, a signal from a secondary feedback loop for each of the servo systems, which is normally overridden by the control signals available during normal operation, acts to position the flaps such that the forward flap is up and the aft flaps down to smoothly and rapidly land the craft.

The above and other objects and features of the invention will become apparent from the following detailed description taken in connection with the accompanying drawings which form a part of this specification, and in which.

DESCRIPTION OF THE PREFERRED EMBODIMENT

Figure 1:
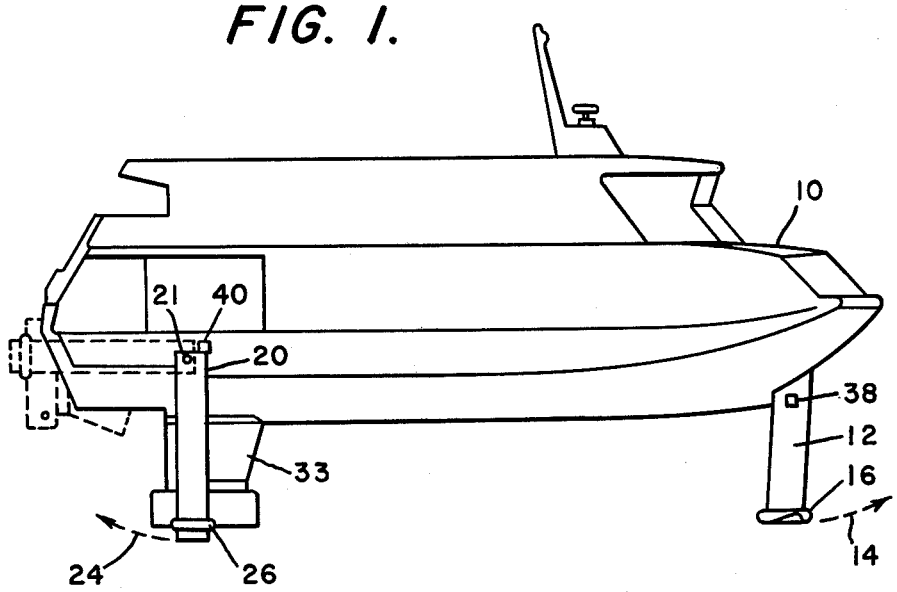
FIG. 1 is a side view of a typical hydrofoil craft with which the control system of the present invention can be used.

Referring now to the drawings, and particularly to FIG. 1, the hydrofoil shown includes a conventional hull 10 which can be provided with a propeller or the like and an inboard motor such that it can traverse the surface of water as a conventional displacement ship. Pivotally connected to the hull is a forward swiveled strut or rudder 12 which is rotatable about a vertical axis in order to steer the craft in the foil-borne mode of operation. The rudder 12 can also be swiveled upwardly in the direction of arrow 14 to clear the surface of the water when the craft is operating as a coventional displacement ship. Carried on the lower end of the rudder 12 is a forward foil 16 (FIG. 2) which carries at its trailing edge control surfaces or flaps 18 which are interconnected and operate in synchronism. Alternatively, the entire forward foil can be rotated for control. Thus, there is a single forward control surface which may be either a flap or the entire foil.

In the aft portion of the craft, struts 20 and 22 are pivotally connected to the hull 10 about an axis 21. The struts 20 and 22 can be rotated downwardly into the solid-line position shown in FIG. 1 for foil-borne operation, or can be rotated backwardly in the direction of arrow 24 and into the dotted-line position shown when the craft operates as a conventional displacement ship. Extending between the lower ends of the struts 20 and 22 is an aft foil 26 which carries at its trailing edge two starboard flaps 28 and 30 and two port flaps 32 and 34. Alternatively, the entire starboard and port foils can be rotated to serve as control surfaces. As will be seen, each set of starboard flaps and each set of port flaps normally operate in synchronism.

Carried between the struts 20 and 22 and pivotally connected to the hull 10 about axis 21 is a gas turbine-water jet propulsion system 33 which provides the forward thrust for the craft during foil-borne operation. It should be understood, however, that a propeller or other type of thrust-producing device can be used in accordance with the invention.

With the rudder 12 and struts 20 and 22 retracted, the craft may operate in the hull-borne mode. In the foil-borne mode of operation, both the rudder 12 and its foil 16, and struts 20 and 22 with foil 26, are rotated downwardly into the solid-line positions shown in FIG. 1 and locked in position. In order to become foil-borne, the pilot sets the desired foil depth in a manner hereinafter described and the throttles are advanced. The craft, therefore, will accelerate and the hull will clear the water and continue to rise until it stabilizes at the commanded foil depth. The normal landing procedure is to simply reduce the throttle setting, allowing the ship to settle to the hull as the speed decays.

Figure 2:
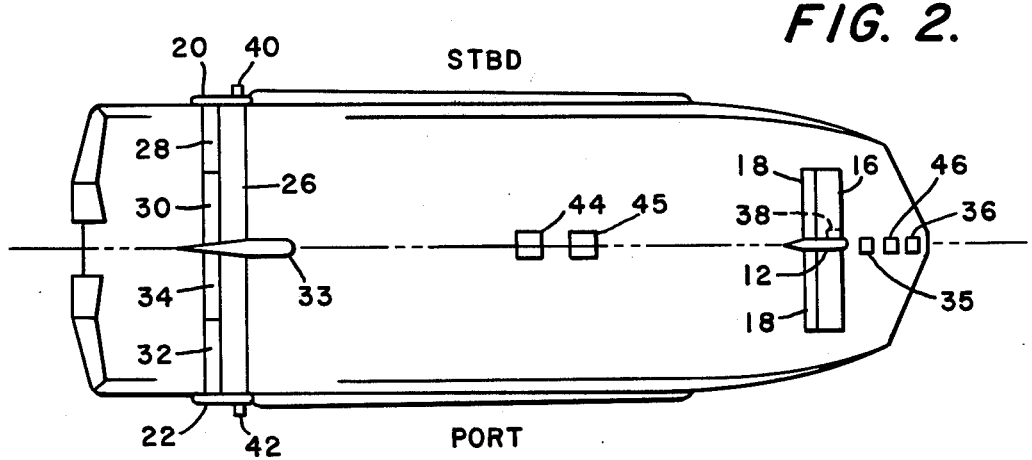
FIG. 2 is a bottom view of the craft shown in FIG. 1.

Mounted on the hull, as shown in FIG. 2, are sensors for producing electrical signals indicative of craft motion. Thus, at the bow of the craft is a height sensor 36 which produces an electrical signal proportional to the height of the bow above the surface of the water during foil-borne operation. Also at the bow of the ship is a forward vertical accelerometer 35 which produces an electrical signal proportional to vertical acceleration. Mounted on the rudder 12 is a lateral accelerometer 38 which produces an electrical signal proportional to lateral or sideways acceleration of the craft. Mounted on the top of the starboard strut 20 is an aft starboard vertical accelerometer 40, and mounted at the top of the port strut 22 is an aft port vertical accelerometer 42. Means are also provided for sensing motion of the craft about its pitch and roll axes; and in accordance with the present invention, two such sensors are provided. For this purpose, two vertical gyros 44 and 45 are mounted in the craft and produce signals proportional to the angle of the craft with respect to vertical about its pitch and roll axes. The devices 44 and 45 are preferably identical and normally produce substantially identical signals. Finally, a yaw rate gyro 46 is provided. The accelerometers and the gyros as described will thus sense motions of the craft about its roll, pitch and yaw axes.

Any movement about the roll axis will be sensed by the vertical gyros 44 and 45 as well as the aft accelerometers 40 and 42. The gyros 44 and 45 will produce identical output signals proportional to the amount or degree of roll, while the accelerometers 40 and 42 will produce signals proportional to the second rate of change in position about the roll axis. Any movement about the pitch axis will be sensed by the vertical gyros 44 and 45 as well as both the forward and aft accelerometers 35, 40 and 42. Finally, any movement about the yaw axis will be sensed by the yaw rate gyro 46 as well as by the lateral accelerometer 38.

In the normal control of the hydrofoil shown herein, the change of height of the hull above the water is controlled solely by the forward flap 18. In order to raise or lower the hull while foil-borne, the forward flap is rotated downward, thereby increasing the lift afforded by the forward foil 16 and causing the hull to elevate out of the water. In order to eliminate or minimize pitching motions about the pitch axis, both the forward and aft control surfaces are employed. However, the forward and aft surfaces operate in opposite directions to correct any pitch condition. Compensation for movement about the roll axis is achieved solely by the aft surfaces 28, 30, 32 and 34. However, in this case, the starboard flaps move in a direction opposite to the port flaps to correct for any undesired rolling motion. In turning the craft, the aft flaps are initially positioned to cause the craft to bank about its roll axis, and the rudder 12 is then rotated to follow through. This gives a much better and smoother turning action since the correct roll inclination is achieved before any substantial turning of the craft occurs by means of the rudder.

The particular hydrofoil control system described herein forms the subject matter of the above-mentioned copending application Ser. No. 302,559. The present invention, however, can be used with any hyrdofoil control system which includes a roll control having sensing means for sensing motion about the roll axis and control surfaces actuated in response to signals produced by such sensing means.

Figure 3:
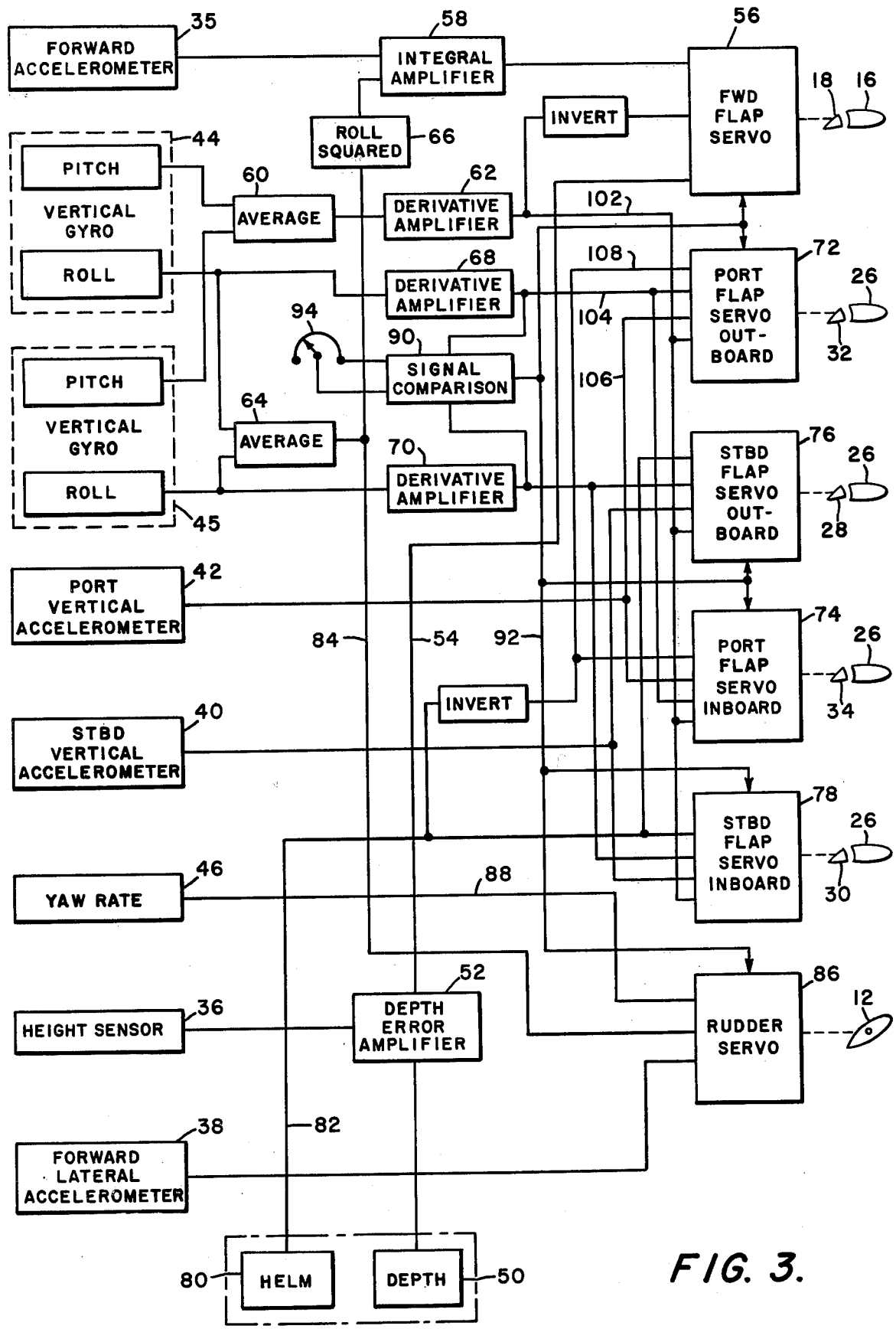
FIG. 3 is a block schematic diagram showing the overall control system of the invention.

The control system is shown in the form of a block diagram in FIG. 3. As there shown, the signal from the height sensor 36 proportional to actual height of the craft above the water surface is compared with a height signal from the pilothouse depth control 50 in a depth error amplifier 52. If the two signals fed to the amplifier 52 are not the same, then an error signal is developed on lead 54 and applied to a forward flap servo system 56 which causes the forward flap 18 to rotate downwardly or upwardly, depending upon whether the hull should rise or descend.

The forward accelerometer 35 senses acceleration, either upward or downward, at the bow and produces an electrical signal for controlling the forward flap 18 to counteract movement about the pitch axis of the craft. The output of the forward accelerometer 35, however, is combined in an integral amplifier 58 with a signal proportional to the square of the roll motion signal, derived as described hereinafter, before the combined signal is applied to the forward flap servo 56. This is for the reason that during normal rolling action, or while the craft is being banked during a turn, the rolling movement produces a component of vertical acceleration which must be taken into consideration.

A signal proportional to the angle of the craft about the pitch axis is derived from the vertical gyros 44 and 45. These two gyros are substantially identical, and the pitch signals produced by the two gyros are combined in an averaging circuit 60 and applied to a derivative amplifier 62 which produces an output signal which varies as a function of pitch angle from the horizontal as well as the rate of change of the pitch angle. The output of the pitch derivative amplifier 62 is applied to all of the aft flap servos and is also applied in inverted form to the forward flap servo 56 to achieve differential control. This signal is used for stability augmentation, ride smoothing in a seaway, and automatic pitch trim control.

If the craft is rolling about its roll axis, signals are derived from the vertical gyros 44 and 45. The signals from these gyros are normally identical and are proportional to the angle of the craft from the vertical about the roll axis. The two signals are combined in an averaging circuit 64 to provide a signal which is applied to the roll squared circuit 66 for combination with the forward accelerometer signal as described above. In addition, the signal from the vertical gyro 44 is applied to a derivative amplifier 68 and the signal from the gyro 45 is applied to a derivative amplifier 70. The signals applied to these amplifiers will, of course, increase in one direction or polarity and then decrease to zero and increase in the other polarity as the craft rolls from side-to-side. This produces at the outputs of the derivative amplifiers 68 and 70, signals which vary as a function of both the roll angle and the rate of change of roll angle. The signal from derivative amplifier 68 is applied to the aft port flap servos 72 and 74; while the signal from the derivative amplifier 70 is applied to the aft starboard flap servos 76 and 78. The arrangement is such that a signal of one polarity is thus applied to the port flap servos, while a signal of inverted polarity is applied to the starboard flap servos to achieve rotation of the port and starboard flaps in opposite directions to counteract the rolling motion and stabilize the craft about the roll axis.

The output of the port vertical accelerometer 42 is applied to the port flap servos 72 and 74, and the output of the starboard vertical accelerometer 40 is applied to the starboard flap servos 76 and 78. These signals act to vary the flap positions to counteract any vertical accelerations or heave on their respective sides of the craft.

Movement of the craft about its yaw axis, or turning movement, is controlled by the roll control system and by signals from the helm 80. If it is desired to turn while the craft is traveling through smooth water, for example, a signal is applied to the lead 82 from the helm 80 of a magnitude and polarity determined by the desired direction and extent of the turn. This signal is applied to the starboard servos 76 and 78 and in inverted form to the port servos 72 and 74. The result is that one set of aft flaps rotates downwardly while the other set rotates upwardly to cause the craft to bank about its roll axis. This action will continue until the angle of roll as sensed by the gyros 44 and 45 is such as to generate signals to balance out the helm signal. At the same time, the roll angle signal derived from the averaging circuit 64 is applied through a lead 84 to the rudder servo 86. This causes the rudder 12 to rotate after the craft begins to bank about the roll axis, causing the craft to turn in the direction in which it has been banked. Thus, if the craft banks to the right in response to a signal from helm 80, the rudder 12 will rotate to steer the craft to the right. This gives a very smooth turn for all sea conditions encountered with a minimum of acceleration forces on the passengers and crew.

As the ship turns, the yaw rate gyro 46 will produce a signal on lead 88 proportional to the rate of turning about the yaw axis; and this is utilized in the rudder servo 86 to limit the rate of turning. Similarly, the signal from the lateral accelerometer 38 is also applied to the rudder servo 86 to limit the lateral acceleration. After the desired turn has been executed, the helm 80 is returned to its center or null position and the signal on lead 82 drops to zero. The positions of the aft flaps are thus reversed under the control of the vertical gyros 44 and 45 to bring the craft back to its upright position with the rudder 12 again centered.

Figure 4:
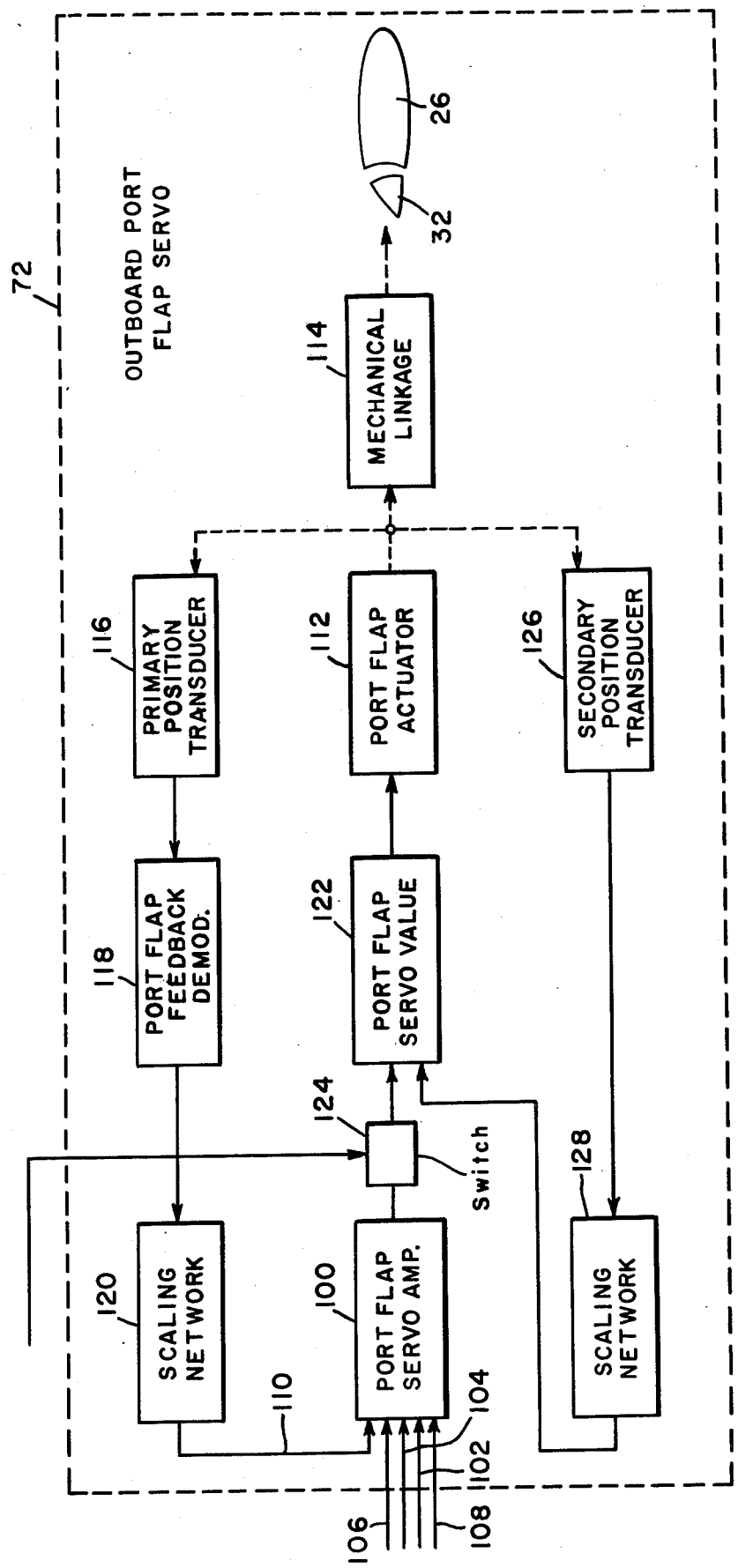
FIG. 4 is a detailed block diagram of the primary and secondary servo systems for each of the control surfaces of the craft, showing the manner in which the primary control loop is disabled to effect an automatic landing procedure.

All of the servos shown in FIG. 3 are identical and, accordingly, only the outboard port flap servo 72 will be described in detail, it being understood that the remaining servos are the same. The outboard port flap servo is shown in FIG. 4. It includes a port flap servo amplifier 100 which, in effect, comprises an operational amplifier having five summed inputs applied to one of its two input terminals through resistors. In the case of servo 72, the four inputs to the operational amplifier 100 include signals on leads 102–110. The signal on lead 102 is that from the pitch derivative amplifier 62; the signal on lead 104 is that from the roll derivative amplifier 68; the signal on lead 106 is that from the port vertical accelerometer 42; and that on lead 108 is from the helm 80. The signal on lead 110 is a feedback signal proportional to actual flap position. That is, a forward flap actuator 112 is connected through a mechanical linkage 114 to the outboard port flap 32. This same mechanical linkage 114 is connected to a primary position transducer 116 which produces a signal whose magnitude varies as a function of the angular position of the flap 32 and whose polarity depends upon whether the flap is rotated upwardly or downwardly from its central or null position. This signal is applied through a feedback demodulator 118 and a scaling network 120 to lead 110 and, hence, to the input of the servo amplifier 100.

The arrangement, of course, comprises a conventional servo system wherein an output signal from the servo amplifier 100 will actuate the port flap servo valve 122 and the port flap actuator 112 to vary the position of flap 32. When the position is varied, a feedback signal is generated at the output of network 116; and this signal persists until it nulls out or cancels the combined input signals on the other input leads 102–110 which initiated the control action.

Interposed between the port flap servo amplifier 100 and the servo valve 122 is a switch 124 which is closed at all times except when an unsafe roll condition occurs. A secondary feedback loop is provided which includes a secondary position transducer 126 connected to the port flap actuator 112 and linkage 114 such that the output of the secondary transducer 126 will be a signal proportional to actual flap position from some preset condition, which preset condition is that necessary to cause the craft to land. In the case of the aft flaps, the preset position is a downward inclination; whereas in the case of the forward flap servo the preset condition is upward. The output of the secondary transducer 126 is fed through scaling network 128 directly into the port flap servo valve 122. The command from transducer 126 is applied continually to the servo valve 122; but during normal operation and when switch 124 is closed, the commands from the amplifier 100 will dominate and override those from transducer 126. When, however, switch 124 opens and no other input commands are applied to the servo valve 122, the secondary servo loop will position the control surface 32 to obtain a null on the secondary position feedback. At this point, the control surface is positioned to effect a rapid landing, this being a downward inclination in the case of the aft foils as explained above.

Reverting again to FIG. 3, it will be noted that the outputs of the roll derivative amplifiers 68 and 70, responsive to the two identical roll sensing gyros 44 and 45, are applied to a signal comparison circuit 90 where they are compared with each other. Under normal conditions, the signals from the two gyros 44 and 45 will be substantially identical, and the difference between them will be essentially zero so that no output signal appears from the circuit 90. If a malfunction of either of the two gyros should occur, however, or if there should be a failure in the circuitry such as a short-circuit or open-circuit in one of the amplifiers or circuits, the signals derived from the two gyros (i.e., the output signals of the amplifiers 68 and 70) will no longer be identical. Assuming that the difference persists for a predetermined time and assuming further that the difference in the outputs of the two amplifiers 68 and 70 exceeds a predetermined value, an output signal will appear from the signal comparison circuit 90; and this signal is applied through the lead 92 to each of the switches 124 (FIG. 4) of each of the flap servos to open the switch. As a consequence, the primary position feedback network is disconnected from the flap servo valves 122 and the secondary position transducer 126 takes over in each servo system, thereby causing the aft flaps to rotate downwardly and the forward flap to rotate upwardly in order to cause a rapid but gentle descent of the hull onto the water.

As was explained above, an output signal is generated by the comparison circuit 90 only when the difference in the signals from amplifiers 68 and 70 exceeds a predetermined amount and persists for a predetermined period of time. The latter effect can be achieved by damping the response of the signal comparison circuit 90. This prevents large but extremely short duration transients in either roll system from exciting the automatic landing circuit. Specifically, the damping is such that an output signal will not be generated by the signal comparison circuit 90 until the difference in the two roll signals persist for at least 100 milliseconds.

The magnitude of the difference between the signals from amplifiers 68 and 70 which will initiate an automatic landing procedure can be controlled, for example, by means of a rheostat 94. Normally, the rheostat 94 is set such that the difference in roll signals must be greater than 10° to excite the automatic landing system; however this can be varied, depending upon requirements.

It can thus be seen that the present invention provides means in an automatic control system for hydrofoils wherein the normal or primary position feedback network is disconnected from the control surface servos for the craft and secondary feedback networks are caused to rotate the flaps to land the craft quickly and safely. Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a control system for a hydrofoil craft of the type having at least one control surface, the combination of:
    electrical circuit means including a primary servo system for controlling said surface during normal operation of the hydrofoil,
    auxiliary electrical circuit means including a secondary servo feedback system preset to position said surface to cause said hydrofoil craft to descend from a foil-borne to a hull-borne mode of operation,
    first and second sensing means for sensing motion of the craft about its roll axis and providing output signals in response thereto,
    means for comparing the output signals of said first and second sensing means, and
    means responsive to a predetermined difference between said signals for disabling said primary servo system and enabling said secondary servo feedback system to position said surface to cause said hydrofoil craft to descend from a foil-borne to a hull-borne mode of operation.

2. The control system of claim 1 incorporating means for preventing disabling of said primary servo system until said predetermined difference between said signals persists for a predetermined period of time.

3. The control system of claim 1 wherein said predetermined difference exists when the difference in said signals is greater than that which indicates a difference of 10° in the roll angles sensed by said sensing means.

4. The control system of claim 1 wherein the hydrofoil craft includes forward and aft control surfaces, and said means responsive enables secondary servo systems for the forward and aft surfaces to position the forward surface upwardly and the aft control surface downwardly.

5. The control system of claim 1 including an actuator for said control surface, the primary and secondary servo systems being connected simultaneously to the actuator when the difference between said signals is below said predetermined difference with the primary servo system overriding the secondary, and switch means for disconnecting said primary servo system from said actuator to permit the secondary system to take over when said predetermined difference is exceeded.

6. The control system of claim 1 wherein said control surface is generally horizontal and said hydrofoil craft includes a rudder and primary and secondary servo systems therefor, said primary rudder servo system being disabled when said predetermined difference in signals exists.

* * * * *